United States Patent

Hayes

(10) Patent No.: US 10,463,092 B1
(45) Date of Patent: Nov. 5, 2019

(54) BREATH CONDITIONER

(71) Applicant: Ardent Conceptual Design, Ltd., Sherman, TX (US)

(72) Inventor: Clint A. Hayes, Sherman, TX (US)

(73) Assignee: Ardent Conceptual Design, Ltd., Sherman, TX (US)

( * ) Notice: Subject to any disclaimer, the term of this patent is extended or adjusted under 35 U.S.C. 154(b) by 297 days.

(21) Appl. No.: 14/081,762

(22) Filed: Nov. 15, 2013

Related U.S. Application Data

(60) Provisional application No. 61/726,986, filed on Nov. 15, 2012.

(51) Int. Cl.
*A41D 13/11* (2006.01)
*A41D 13/005* (2006.01)
*A41D 27/28* (2006.01)

(52) U.S. Cl.
CPC ...... *A41D 13/1107* (2013.01); *A41D 13/0051* (2013.01); *A41D 27/28* (2013.01)

(58) Field of Classification Search
CPC ... A61M 16/1065; A61M 16/06; A62B 18/10; A62B 23/02; A62B 23/00; A62B 23/025; A41D 13/11; A41D 13/1107; A41D 27/28
See application file for complete search history.

(56) References Cited

U.S. PATENT DOCUMENTS

| | | | |
|---|---|---|---|
| 4,802,626 A | 2/1989 | Forbes et al. | |
| 5,117,821 A * | 6/1992 | White | 128/206.15 |
| 5,497,791 A * | 3/1996 | Bowen | A24F 13/00 |
| | | | 131/175 |
| 5,538,013 A | 7/1996 | Brannon | |
| 5,622,314 A | 4/1997 | Eason | |
| 5,697,105 A | 12/1997 | White | |
| 5,916,552 A | 6/1999 | Perry | |
| 5,971,208 A | 10/1999 | Kennedy | |
| 7,883,677 B2 | 2/2011 | Palozzi | |
| 8,206,697 B1 | 6/2012 | Schmidt | |
| 2004/0064995 A1* | 4/2004 | Gilmore | 43/1 |
| 2008/0245364 A1* | 10/2008 | Patterson | 128/201.25 |
| 2009/0084384 A1* | 4/2009 | Cheng et al. | 128/206.19 |
| 2009/0151216 A1 | 6/2009 | Haggerty | |
| 2009/0293730 A1* | 12/2009 | Volo et al. | 96/222 |
| 2010/0063640 A1 | 3/2010 | Olmstead | |

* cited by examiner

Primary Examiner — Kari K Rodriquez

(57) ABSTRACT

One aspect provides a breath conditioner. The conditioner, in one example, includes an enclosure for disposition of a user, the enclosure configured to collect substantially all exhaust breath of the user. The conditioner, in this example, may further include a one-way air intake valve in fluid communication with the enclosure for admitting ambient air through the enclosure to the mouth or nose but substantially precluding the exhaust breath from exiting, and an exhaust breath aromatizing stage in fluid communication with the enclosure for scenting the exhaust breath. The conditioner, in this example, may further include an exhaust breath purification stage in fluid communication with the enclosure for filtering the exhaust breath, the purification stage positioned in fluid flow relationship between the enclosure and the aromatizing stage, and a one-way discharge valve in fluid communication with the enclosure for discharging the exhaust breath to the ambient atmosphere.

22 Claims, 4 Drawing Sheets

BREATH CONDITIONER

CROSS-REFERENCE TO RELATED APPLICATION

This application claims the benefit of U.S. Provisional Application Ser. No. 61/726,986, filed by Clint Hayes on Nov. 15, 2012, entitled "Breath Conditioner," commonly assigned with this application and incorporated herein by reference.

TECHNICAL FIELD

This application is directed, in general, to a breath conditioner and, more specifically, to a breath conditioner that substantially eliminates breath odor and adds scent to the purified breath.

BACKGROUND

Hunting game, over the years, has become a multi-billion dollar sport. In fact, most hunters continually striving to find that one device that gives them a significant advantage over the game they so wish to kill. Moreover, most hunters will spend whatever it takes to obtain that advantage.

Accordingly, what is needed in the art is an improved device or method that addresses the foregoing problems, and gives the hunters that added advantage over their counterpart game.

SUMMARY

One aspect provides a breath conditioner. The breath conditioner, in one example, includes an enclosure for disposition on a face or in a mouth of a user, the enclosure configured to collect substantially all exhaust breath of the user. The breath conditioner, in this example, may further include a one-way air intake valve in fluid communication with the enclosure for admitting ambient air through the enclosure to the mouth or nose of the user but substantially precluding the exhaust breath from exiting, and an exhaust breath aromatizing stage in fluid communication with the enclosure for scenting the exhaust breath of the user. The breath conditioner, in this example, may further include an exhaust breath purification stage in fluid communication with the enclosure for filtering the exhaust breath of the user, the exhaust breath purification stage positioned in fluid flow relationship between the enclosure and the exhaust breath aromatizing stage, and a one-way discharge valve in fluid communication with the enclosure for discharging the exhaust breath of the user to the ambient atmosphere.

Another aspect provides a method for manufacturing a breath conditioner. The method for manufacturing the breath conditioner, in accordance with one embodiment of the disclosure, includes: 1) providing an enclosure for disposition on a face or in a mouth of a user, the enclosure configured to collect substantially all exhaust breath of the user, 2) attaching a one-way air intake valve in fluid communication with the enclosure for admitting ambient air through the enclosure to the mouth or nose of the user but substantially precluding the exhaust breath from exiting, 3) attaching an exhaust breath aromatizing stage in fluid communication with the enclosure for scenting the exhaust breath of the user, 4) attaching an exhaust breath purification stage in fluid communication with the enclosure for filtering the exhaust breath of the user, the exhaust breath purification stage positioned in fluid flow relationship between the enclosure and the exhaust breath aromatizing stage, and 5) attaching a one-way discharge valve in fluid communication with the enclosure for discharging the exhaust breath of the user to the ambient atmosphere.

BRIEF DESCRIPTION

Reference is now made to the following descriptions taken in conjunction with the accompanying drawings, in which.

DETAILED DESCRIPTION

Figure 1:
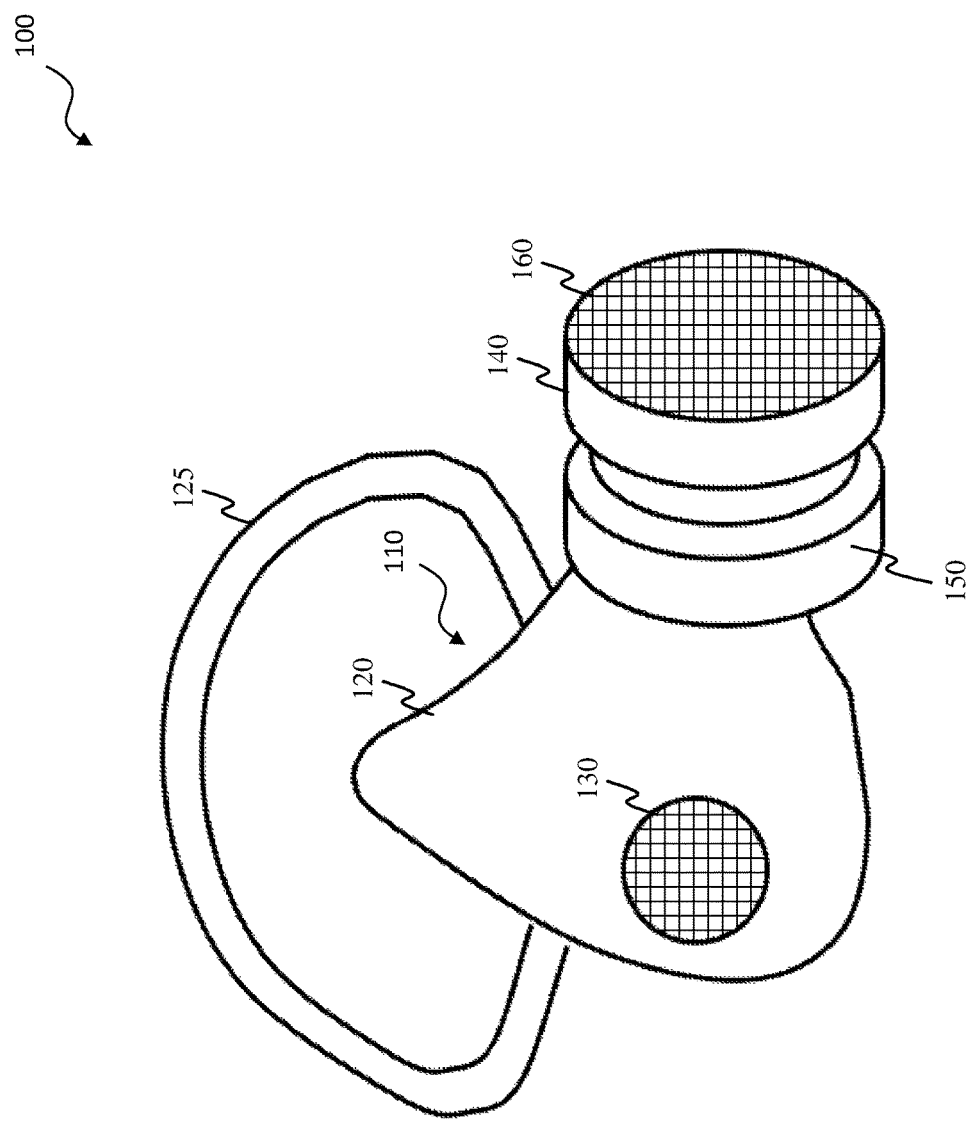
FIG. 1 is an embodiment of a breath conditioner in accordance with the disclosure.

Exhaled human breath is a complex mixture of various gases, vapors, aerosols, and particulate matter. Exhaled human breath includes inorganic species such as nitrogen, oxygen, carbon dioxide, nitric oxide, ammonia, and trace gases; as well as more than 1000 separate Volatile Organic Compounds (VOCs). Because exhaled human breath has a relative humidity of 100%, aerosols and particulates can remain in suspension for hundreds of meters as the water vapor serves as an excellent vehicle to convey these concentrated odors.

Human mouth odor is primarily derived from VOCs generated by the over 600 species of aerobic and anaerobic bacteria found in the biofilm covering the tongue, periodontal pockets, teeth, and below the gumline. The most malodorous oral VOCs are Volatile Sulfur Compounds (VSCs) that derive from the proteolytic putrefaction of sulfur containing amino acids in dietary and salivary proteins. The intensity of mouth odor is impacted by eating certain foods (such as cheese, fish, meat, eggs, onions, and garlic) and by oral hygiene.

But VOCs and VSCs do not originate simply in the mouth. Breath odor is also generated in the sinus cavities, nasopharynx, oropharynx, glottis, esophagus/stomach, trachea, bronchioles, pulmonary alveoli, and ultimately, the blood. In addition to diet and oral hygiene, the type and concentration of odors discharged by an individual depend upon a number of factors including their emotional status, stress, the use of alcohol/tobacco products, overall fitness, various diseases, and even the species of the individual. Altering these variables can impact the type/concentration of odors in an individual's breath somewhat, but brushing one's teeth, gargling with mouthwash, flossing, taking chlorophyll tablets, etc. have only a moderate and transient impact on overall breath odor.

Many VOCs are introduced into the exhaled air via more than 500 million alveolar units that extract these waste gases from the blood for excretion by exhalation via the nose and mouth. Many of these VOCs are absolutely vile, including methyl mercaptan (the smell of hog feed lots), dimethyl sulfide (the smell of decomposing seaweed), ketones (putrid fruit), isoprene (hot rubber), hydrogen sulfide (rotten eggs), indole and skatole (human fecal matter), isovaleric acid and butyric acid (sweaty feet), putrescine (rancid meat), and cadavarine (decaying corpse). These gases are offensive at even extremely small concentrations.

Humans produce a prodigious amount of exhaled breath. An adult male will exhale an estimated 400 liters per hour at rest. This volume can increase to over 5,000 liters per hour with exercise.

In order for an odor to be perceived, an odor must reach a certain olfactory threshold, or concentration level that is measured in parts per million (ppm) or parts per billion. An odor falling short of the required threshold is faint and confusing—this is what happens when you get a whiff of something but cannot fully identify the odor.

Due to anatomic and physiologic specialization, various species have striking disparities in their olfactory thresholds. Humans can begin to discern odors starting at concentrations of 10 ppm, while domestic dogs can smell human odor as low as 10 ppb. Dogs have such a remarkable sense of smell that they can discern human odors even days later and follow a scent trail over long distances, even across water. Individual dogs have even been trained to smell the exhaled breath of patients to determine whether that individual has disease states such as cancer, etc. Domestic dogs have approximately 200 million olfactory units, while whitetail deer have approximately 297 million olfactory units, suggesting that a deer's sense of smell is 30% more acute than that of the dog.

Game animals (deer, elk, bears, boar, etc.) interact with their environment primarily through their olfactory capabilities. Because we humans are largely visually oriented, it is difficult, if not impossible to comprehend just how important the sense of smell is to these animals. Their keen sense of smell allows game animals to escape would-be predators, detect new sources of food, and efficiently communicate with one another (such as gender, health, dominance status, reproductive state, individuality and so on).

The combination of the copious amounts of fetid odors expelled from a hunter's nose and mouth and the remarkable olfactory capabilities of game animals make avoiding detection by these animals extremely difficult. In order to escape detection from prey species, hunters conventionally approach wildlife from the downwind side—a practice widely known as "hunting the wind".

With the foregoing acknowledgements in mind, the present disclosure recognizes that hunters can gain a significant advantage over their game by taking advantage of the keen sense of smell that the game animals have. For instance, the present disclosure has recognized that game animals can easily be tricked by first purifying the exhaust breath of the hunter, and then aromatizing the purified exhaust breath. In this scenario, not only can the game not detect the presence of a human, but in turn will associate the aromatized exhaust breath for something desirable. Accordingly, hunters traditionally approach to hunting wildlife from the downwind side—a practice widely known as "hunting the wind"—may become a thing of the past.

Turning to FIG. 1, illustrated is a breath conditioner 100 in accordance with one embodiment of the disclosure. The breath conditioner 100, in the embodiment shown, includes an enclosure 110. The enclosure 110, in one embodiment, is for disposition on a face or in a mouth of a user (e.g., hunter). In the embodiment shown, the enclosure 110 is a face mask 120 having a strap 125. As those skilled in the art appreciate, the enclosure 110, including the face mask 120 and strap 125, are configured to collect substantially all (if not all) exhaust breath of the user. For example, face mask 120 might be configured for disposition on the face of the user in substantial sealed relation thereto, to collect substantially all exhaust of the user. Addition detail regarding the enclosure 110, particularly the face mask 120 and strap 125, may be found in U.S. Pat. Nos. 5,117,821, 5,538,013 and 5,697,105, all of which are incorporated herein by reference.

The breath conditioner 100 of FIG. 1, at least in the embodiment shown, further includes a one-way air intake valve 130. The one-way air intake valve 130 is in fluid communication with the enclosure 110. Accordingly, the one-way air intake valve 130 is configured to admit ambient air into the enclosure 110 to the mouth or nose of the user, but substantially preclude the exhaust breath from exiting. In an ideal situation, the one-way air intake valve 130 entirely precludes the exhaust breath from exiting the breath conditioner therefrom.

The breath conditioner 100 of FIG. 1 further includes an exhaust breath aromatizing stage 140. The exhaust breath aromatizing stage 140, in the embodiment shown, is in fluid communication with the enclosure 110. In this embodiment, the exhaust breath aromatizing stage 140 is configured to scent the exhaust breath of the user. For example, as discussed above, the exhaust breath aromatizing stage 140 can scent the exhaust breath of the user to impart information upon the exhaust breath that is generally appealing to game. In one embodiment, this includes using essential oils to impart the information. In another embodiment, this includes using game urine, cedar scent, apple essence, among others, many of which can be in gaseous, liquid or solid form. Those skilled in the art understand that a variety of different aromatizing elements are within the scope of the present disclosure. Nevertheless, certain specific scent aromatizing elements, and information related thereto, may be found in U.S. Pat. Nos. 8,206,697, 5,622,314, 5,971,208, 4,802,626, 5,916,552, 4,802,626, and 7,883,677, as well as U.S. Pat. App. Nos. 2010/0063640 and 2009/0151216, all of which are incorporated herein by reference.

In one embodiment of the disclosure, exhaust breath aromatizing stage 140 is configured to accept interchangeable aromatizing elements (such as wafers, cartridges, magazines, cassettes, vials, ampoules, etc.). For example, embodiments exist wherein the aromatizing elements may be tailored for a specific type of animal. Additionally, they may be exchanged when the aromatizing elements have become stale, and thus less effective than desirable. For example, the interchangeable aromatizing elements could interchangeable aromatizing cartridges. Other embodiments exist, however, wherein the exhaust breath aromatizing stage 140 is not configured to accept interchangeable aromatizing elements.

The breath conditioner 100 of FIG. 1, in the embodiment shown, further includes an exhaust breath purification stage 150. In the embodiment shown, the exhaust breath purification stage 150 is in fluid communication with the enclosure 110. Accordingly, it is configured to filter the exhaust breath of the user. Further to the embodiment show, the exhaust breath purification stage 150 is positioned in fluid flow relationship between the enclosure 110 and the exhaust breath aromatizing stage 140.

In one embodiment, the exhaust breath purification stage 150 is configured to accept interchangeable filtering elements. For example, the exhaust breath purification stage 150 might be configured to accept interchangeable filtering cartridges. Accordingly, when the exhaust breath purification stage 150 is stale, or loses its effectiveness, it can easily be replaced. Other embodiments exist, however, wherein the exhaust breath purification stage 150 cannot be changed.

Those skilled in the art understand the different types of filter means that might be used in the exhaust breath purification stage 150. For example, in certain embodiments the exhaust breath purification stage 150 includes activated carbon, charcoal, silver, resins, zeolites, or enzymes to break down odor molecules of the exhaust breath of the user. In other embodiments the exhaust breath purification stage 150 includes other known mechanisms to break down odor molecules of the exhaust breath of the user. Addition detail regarding the exhaust breath purification stage 150 may be found in U.S. Pat. Nos. 5,117,821, 5,538,013 and 5,697,105, all of which are incorporated herein by reference.

Returning to FIG. 1, the breath conditioner further includes a one-way discharge valve 160. The one-way discharge valve 160, in the illustrated embodiment, is in fluid communication with the enclosure 110. Accordingly, the one-way discharge valve 160 is configured to discharge the exhaust breath of the user to the ambient atmosphere, but in turn not allow ambient air into the enclosure 110. In certain embodiments, such as shown, the exhaust breath purification stage 150 and aromatizing stage 140 are positioned in fluid flow relationship between the enclosure 110 and the one-way discharge valve 160. Accordingly, the exhaust breath, in this embodiment, is filtered and aromatized prior to it exiting the breath conditioner 100. Other embodiments, however, may have the one-way discharge valve 160 in fluid flow relationship between the enclosure 110 and the exhaust breath purification stage 150.

In the embodiment of FIG. 1, the one-way air intake valve 130 is positioned directly on the face mask 120. Further to this embodiment, the exhaust breath purification stage 150 and aromatizing stage 140 are coupled directly to the face mask 120. For example, in this embodiment the exhaust breath purification stage 150 and aromatizing stage 140 form a single element that is coupled directly to the face mask 120. In one embodiment, the single element is removable. However, in other embodiments, it is not. Other configurations, however, are within the scope of the present disclosure.

Figure 2:
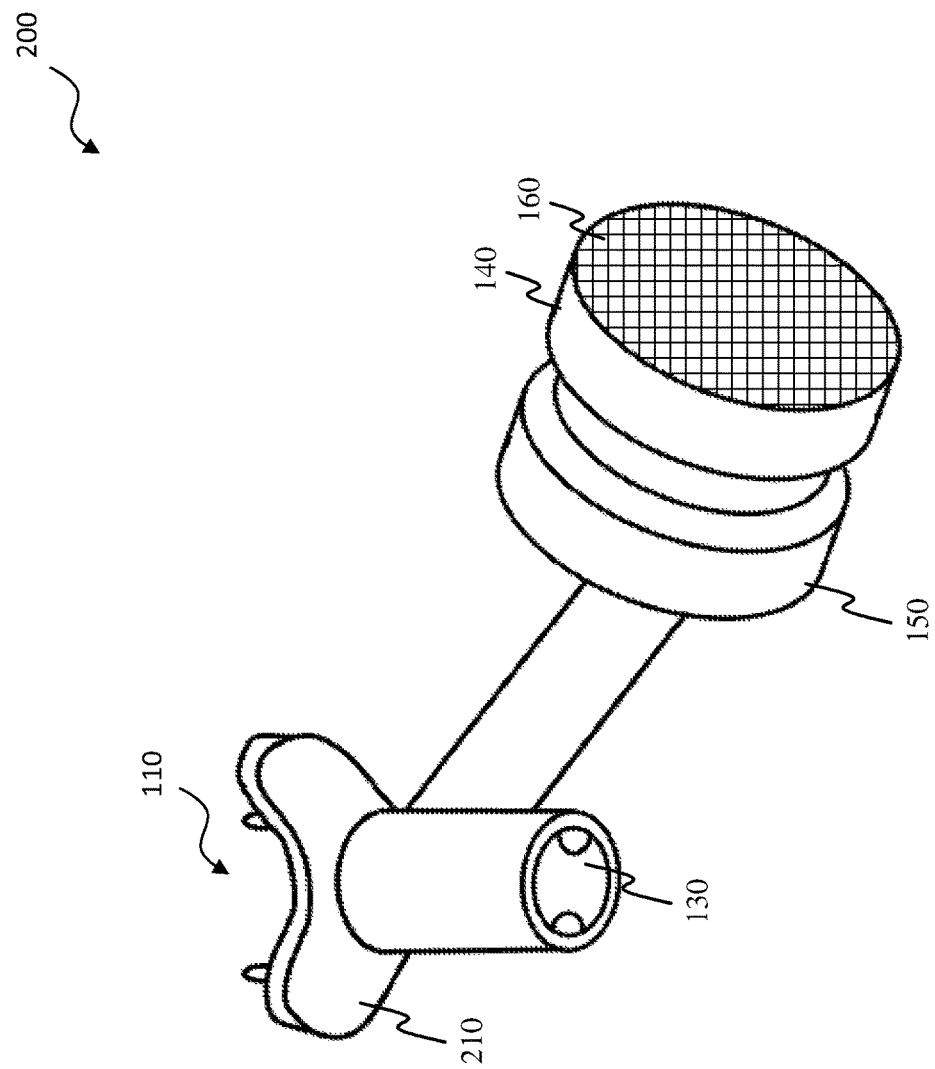
FIG. 2 is an alternative embodiment of a breath conditioner in accordance with the disclosure.

Turning to FIG. 2, illustrated is an alternative embodiment of a breath conditioner 200 in accordance with the disclosure. The breath conditioner 200 is similar in many respects to the breath conditioner 100 of FIG. 1. Accordingly, it can share similar features. For the sake of clarity, like reference numerals have been used amongst the Figures to represent similar features.

The breath conditioner 200 of FIG. 2 differs from the breath conditioner 100 of FIG. 1 in that the breath conditioner 200 uses a mouthpiece 210 as the enclosure 110. Accordingly, as opposed to a face mask that fits the users face, the mouthpiece 210 is inserted into the user's mouth, in a fashion similar to a swimming snorkel. In accordance with one embodiment of the disclosure, the mouthpiece 210 can be rotated within the mouth of the user by about 180 degrees, so that it can accommodate both right handed and left handed hunters. In certain embodiments, the mouthpiece 210 might fit within a mask as shown in FIG. 1.

Figure 3:
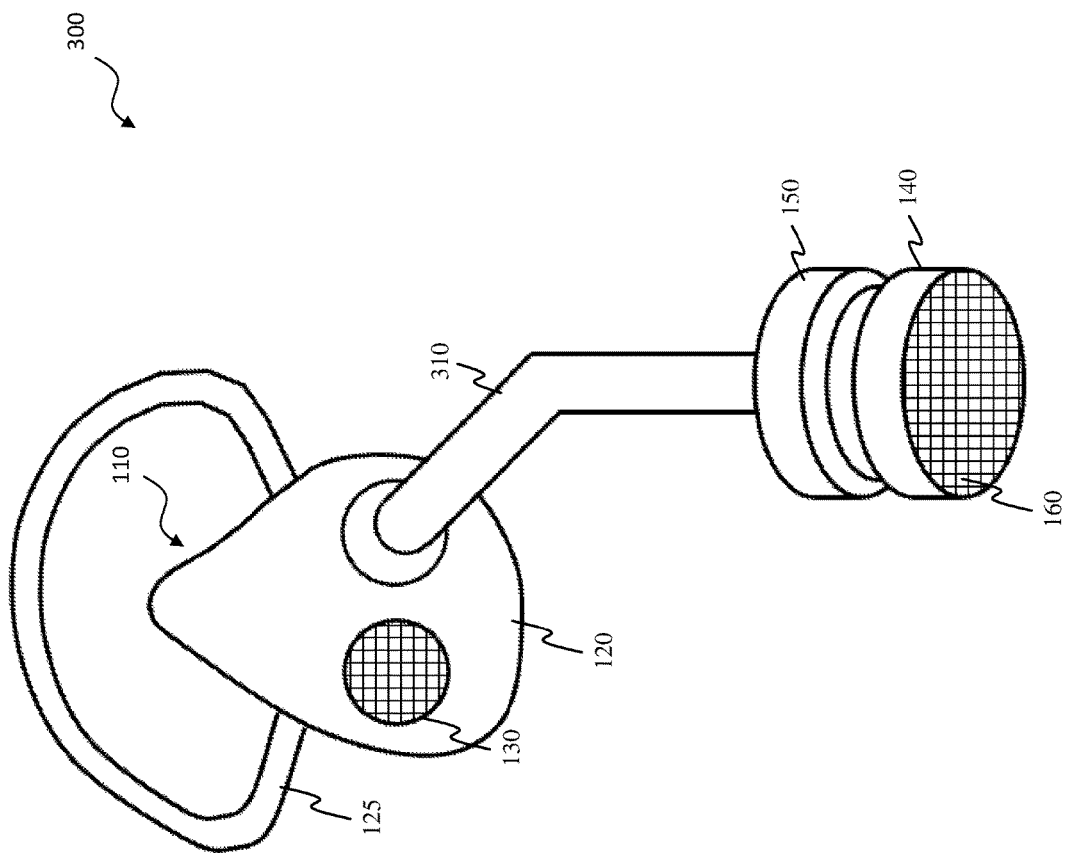
FIG. 3 is yet an alternative embodiment of a breath conditioner in accordance with the disclosure.

Turning to FIG. 3, illustrated is an alternative embodiment of a breath conditioner 300 in accordance with the disclosure. The breath conditioner 300 is similar in many respects to the breath conditioner 100 of FIG. 1. Accordingly, it can share similar features. For the sake of clarity, like reference numerals have been used amongst the Figures to represent similar features.

The breath conditioner 300 of FIG. 3 differs from the breath conditioner 100 of FIG. 1 in that the breath conditioner 300 uses a breath discharge tube 310. In the embodiment shown, the breath discharge tube 310 is positioned in fluid communication with the enclosure 110. Further to the embodiment shown, the breath discharge tube 310 is positioned in fluid flow relationship between the enclosure 110 and the exhaust breath aromatizing stage 140.

The breath discharge tube 310, in one embodiment, allows the exhaust breath purification stage 150 and aromatizing stage 140 to be positioned away from the face of the user. In one embodiment, the breath discharge tube 310 is of sufficient length (l) to extend into the user's clothing for warming a body element of the user. Accordingly, as the user of the breath conditioner breathes, he or she simultaneously warms his or her body.

Figure 4:
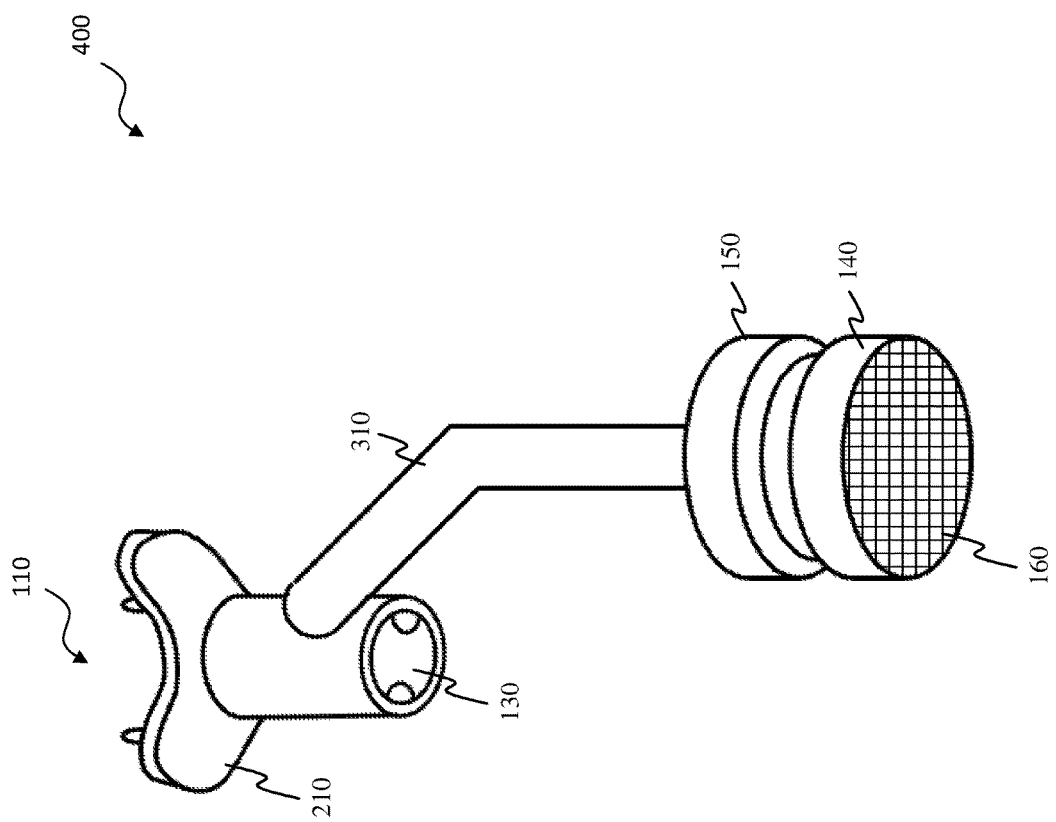
FIG. 4 is yet another alternative embodiment of a breath conditioner in accordance with the disclosure.

Turning to FIG. 4, illustrated is an alternative embodiment of a breath conditioner 400 in accordance with the disclosure. The breath conditioner 400 is similar in many respects to the breath conditioner 200 of FIG. 2. Accordingly, it can share similar features. For the sake of clarity, like reference numerals have been used amongst the Figures to represent similar features.

The breath conditioner 400 of FIG. 4 differs from the breath conditioner 200 of FIG. 2 in that the breath conditioner 400 uses the breath discharge tube 310 in addition to the mouthpiece 210.

Those skilled in the art to which this application relates will appreciate that other and further additions, deletions, substitutions and modifications may be made to the described embodiments.

What is claimed is:

1. A breath conditioner, comprising:
   an enclosure for disposition on a face or in a mouth of a user, the enclosure configured to collect substantially all exhaust breath of the user;
   a one-way air intake valve in fluid communication with the enclosure for admitting ambient air through the enclosure to the mouth or nose of the user but substantially precluding the exhaust breath from exiting, wherein the ambient air does not encounter an aromatizing stage along a path from the environment through the air intake valve to the mouth or nose of the user;
   an exhaust breath purification stage having an interchangeable filtering element that is in fluid communication with the enclosure for filtering the exhaust breath of the user;
   an exhaust breath aromatizing stage having an interchangeable aromatizing element, separate from the exhaust breath purification stage, in fluid communication with the enclosure for scenting the exhaust breath of the user, wherein the exhaust breath purification stage is positioned in fluid flow relationship between the enclosure and the exhaust breath aromatizing stage, and further wherein the interchangeable filtering element and interchangeable aromatizing element may be independently replaced from one another;
   a one-way discharge valve in fluid communication with the enclosure for discharging the exhaust breath of the user to the ambient atmosphere.

2. The breath conditioner of claim 1, further including a breath discharge tube positioned in fluid communication with the enclosure.

3. The breath conditioner of claim 2, wherein the breath discharge tube is positioned in fluid flow relationship between the enclosure and the exhaust breath aromatizing stage.

4. The breath conditioner of claim 2, wherein the breath discharge tube is of sufficient length (l) to extend into the user's clothing for warming a body element of the user.

5. The breath conditioner of claim 1, wherein the exhaust breath purification stage and aromatizing stage are positioned in fluid flow relationship between the enclosure and the one-way discharge valve.

6. The breath conditioner of claim 1, wherein the breath aromatizing stage is configured to accept interchangeable aromatizing elements.

7. The breath conditioner of claim 6, wherein the interchangeable aromatizing elements are interchangeable aromatizing cartridges.

8. The breath conditioner of claim 1, wherein the exhaust breath purification stage is configured to accept interchangeable filtering elements.

9. The breath conditioner of claim 8, wherein the interchangeable filtering elements are interchangeable filtering cartridges.

10. The breath conditioner of claim 1, wherein the enclosure is a face mask for disposition on the face of the user in substantially sealed relation thereto.

11. The breath conditioner of claim 10, wherein the one-way air intake valve is positioned directly on the face mask, and further wherein the exhaust breath purification stage and aromatizing stage are coupled directly to the face mask.

12. The breath conditioner of claim 1, wherein the enclosure is a mouthpiece for disposition within the mouth of the user in substantial sealed relation thereto.

13. The breath conditioner of claim 1, wherein the exhaust breath purification stage and aromatizing stage form a single unit.

14. The breath conditioner of claim 13, wherein the single unit is removable.

15. The breath conditioner of claim 1, wherein the exhaust breath purification stage includes activated carbon, charcoal, silver, resins, zeolites, or enzymes to break down odor molecules of the exhaust breath of the user.

16. The breath conditioner of claim 1, wherein the aromatizing stage includes essential oils.

17. The breath conditioner of claim 1, wherein the aromatizing stage includes animal urine scent.

18. The breath conditioner as recited in claim 1, wherein the animal urine scent is deer urine.

19. A method for manufacturing a breath conditioner, comprising:
provided an enclosure for disposition on a face or in a mouth of a user, the enclosure configured to collect substantially all exhaust breath of the user;
attaching a one-way air intake valve in fluid communication with the enclosure for admitting ambient air through the enclosure to the mouth or nose of the user but substantially precluding the exhaust breath from exiting, wherein the ambient air does not encounter an aromatizing stage along a path from the environment through the air intake valve to the mouth or nose of the user;
attaching an exhaust breath purification stage having an interchangeable filtering element in fluid communication with the enclosure for filtering the exhaust breath of the user;
attaching an exhaust breath aromatizing stage having an interchangeable aromatizing element, separate from the exhaust breath purification stage, in fluid communication with the enclosure for scenting the exhaust breath of the user, wherein all of the exhaust breath purification stage is positioned in fluid flow relationship between the enclosure and the exhaust breath aromatizing stage, and further wherein the interchangeable filtering element and interchangeable aromatizing element may be independently replaced from one another;
attaching a one-way discharge valve in fluid communication with the enclosure for discharging the exhaust breath of the user to the ambient atmosphere.

20. The method of claim 19, further including attaching a breath discharge tube in fluid communication with the enclosure, wherein the breath discharge tube is positioned in fluid flow relationship between the enclosure and the exhaust breath aromatizing stage.

21. The method of claim 20, wherein the exhaust breath purification stage and aromatizing stage are positioned in fluid flow relationship between the enclosure and the one-way discharge valve.

22. A breath conditioner, comprising:
an enclosure for disposition on a face or in a mouth of a user, the enclosure configured to collect substantially all exhaust breath of the user;
a one-way air intake valve in fluid communication with the enclosure for admitting ambient air through the enclosure to the mouth or nose of the user but substantially precluding the exhaust breath from exiting, wherein the ambient air does not encounter an aromatizing stage along a path from the environment through the air intake valve to the mouth or nose of the user;
an exhaust breath purification stage in fluid communication with the enclosure for filtering the exhaust breath of the user;
an exhaust breath aromatizing stage including animal urine scent, separate from the exhaust breath purification stage, in fluid communication with the enclosure for scenting the exhaust breath of the user, wherein the exhaust breath purification stage is positioned in fluid flow relationship between the enclosure and the exhaust breath aromatizing stage;
a one-way discharge valve in fluid communication with the enclosure for discharging the exhaust breath of the user to the ambient atmosphere.

* * * * *